(12) United States Patent
Payne

(10) Patent No.: US 10,689,027 B2
(45) Date of Patent: Jun. 23, 2020

(54) HYDRAULIC STEERING SYSTEM OF A WORK VEHICLE

(71) Applicant: CNH Industrial America LLC, New Holland, PA (US)

(72) Inventor: Daniel Joseph Payne, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 50 days.

(21) Appl. No.: 15/649,504

(22) Filed: Jul. 13, 2017

(65) Prior Publication Data
US 2019/0016379 A1    Jan. 17, 2019

(51) Int. Cl.
| | | |
|---|---|---|
| *B62D 5/12* | (2006.01) | |
| *F15B 11/036* | (2006.01) | |
| *F15B 15/14* | (2006.01) | |

(52) U.S. Cl.
CPC ............ *B62D 5/12* (2013.01); *F15B 11/0365* (2013.01); *F15B 15/1428* (2013.01); *F15B 15/1447* (2013.01); *F15B 2211/7056* (2013.01)

(58) Field of Classification Search
CPC ............... B62D 5/12; B62D 5/10; B62D 5/06
See application file for complete search history.

(56) References Cited

U.S. PATENT DOCUMENTS

| | | | |
|---|---|---|---|
| 2,505,771 A * | 5/1950 | Hoar | F15B 11/036 91/209 |
| 3,186,309 A | 6/1965 | Killebrew | |
| 3,799,104 A | 3/1974 | Kurling | |
| 3,877,349 A | 4/1975 | Schindel | |
| 3,974,893 A | 8/1976 | Conner et al. | |
| 4,060,221 A | 11/1977 | Rilbe | |
| 4,296,677 A | 10/1981 | Little et al. | |
| 4,410,193 A | 10/1983 | Howard | |
| 4,527,465 A * | 7/1985 | Yoshida | B62D 5/22 180/428 |
| 5,251,717 A * | 10/1993 | Klosterhaus | B62D 5/22 180/428 |
| 5,385,218 A | 1/1995 | Migliori | |

(Continued)

FOREIGN PATENT DOCUMENTS

WO    2010/049359    5/2010

*Primary Examiner* — Jacob D Knutson
*Assistant Examiner* — Michael R Stabley
(74) *Attorney, Agent, or Firm* — Rickard K. DeMille; Rebecca L. Henkel

(57) ABSTRACT

A hydraulic steering system of a work vehicle includes a hydraulic cylinder assembly configured to receive hydraulic fluid. The hydraulic cylinder assembly includes a hydraulic cylinder and a shaft assembly disposed within the hydraulic cylinder. The shaft assembly includes a first shaft part extending within the hydraulic cylinder and having a first piston integrally formed thereon and also includes a second shaft part extending within the hydraulic cylinder and having a second piston. The hydraulic cylinder assembly also includes a plurality of sealing members configured to extend radially between the hydraulic cylinder and the shaft assembly to separate the hydraulic cylinder into a first chamber supporting the first piston and a second chamber supporting the second piston. The first chamber and the second chamber are fluidly isolated from each other.

14 Claims, 8 Drawing Sheets

(56) References Cited

U.S. PATENT DOCUMENTS

| | | | |
|---|---|---|---|
| 5,718,115 | A | 2/1998 | Burkner |
| 5,778,760 | A * | 7/1998 | Yuda ..................... F01B 7/00 92/128 |
| 6,047,788 | A | 4/2000 | Bohner et al. |
| 6,266,959 | B1 * | 7/2001 | Markwart ............... F15B 1/24 60/414 |
| 6,422,582 | B1 | 7/2002 | Howard |
| 6,817,067 | B2 * | 11/2004 | Kopp ..................... F15B 7/006 60/476 |
| 6,868,935 | B2 | 3/2005 | Jaberg |
| 7,021,196 | B1 * | 4/2006 | Alderson ............... B62D 5/12 180/417 |
| 9,194,404 | B2 | 11/2015 | Palmieri |
| 2013/0209284 | A1 | 8/2013 | Dreher |

* cited by examiner

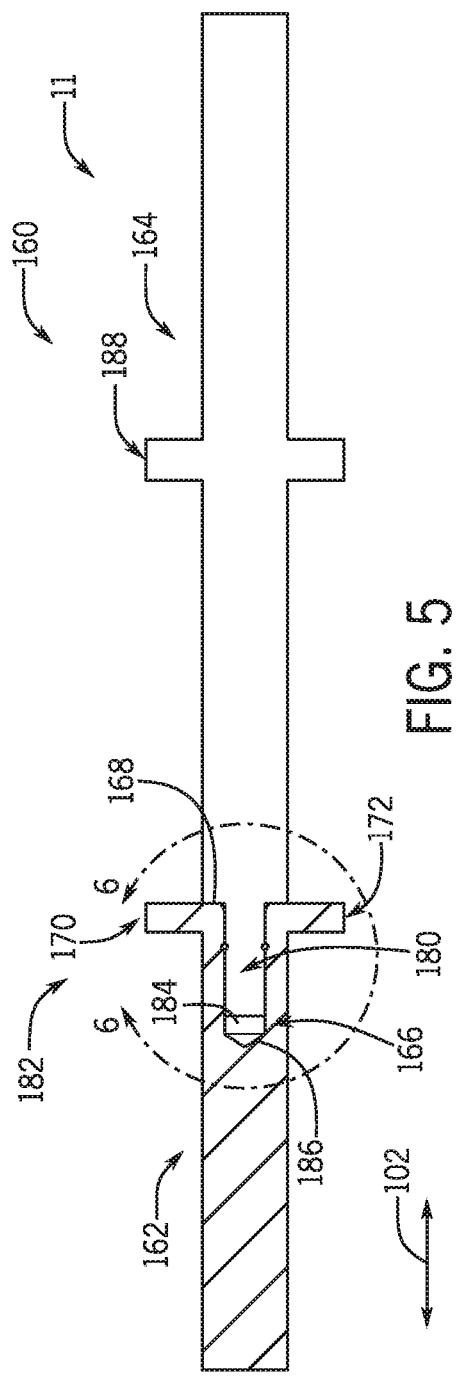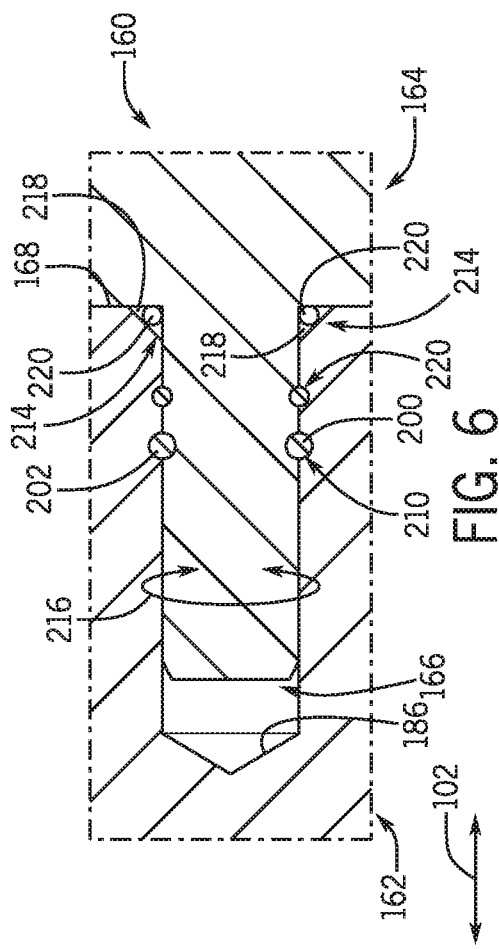

HYDRAULIC STEERING SYSTEM OF A WORK VEHICLE

BACKGROUND

The present disclosure relates generally to a hydraulic steering system of a work vehicle.

Certain work vehicles (e.g., tractors, harvesters, skid steers, etc.) include a hydraulic steering system configured to steer wheels of the work vehicle. The hydraulic steering system may include a hydraulic cylinder fluidly coupled to a control valve and a hydraulic fluid reservoir. The control valve may adjust a flow of the hydraulic fluid to the hydraulic cylinder, and the hydraulic fluid may drive a piston within the hydraulic cylinder to steer the work vehicle. To provide more power, the hydraulic cylinder and the related components may be produced at an increased size. However, physical restrictions may limit the size of the hydraulic cylinder, thereby limiting power provided by the hydraulic steering system.

BRIEF DESCRIPTION

In one embodiment, a hydraulic steering system of a work vehicle includes a hydraulic cylinder assembly configured to receive hydraulic fluid. The hydraulic cylinder assembly includes a hydraulic cylinder having a first longitudinal end portion and a second longitudinal end portion. The hydraulic cylinder assembly also includes a shaft assembly disposed within the hydraulic cylinder. The shaft assembly includes a first shaft part extending within the hydraulic cylinder and having a first piston integrally formed thereon. Additionally, the first piston is configured to receive a first force from the hydraulic fluid that causes the shaft assembly to move relative to the hydraulic cylinder. The shaft assembly also includes a second shaft part extending within the hydraulic cylinder and having a second piston. The second shaft part is coupled to the first shaft part, and the second piston is configured to receive a second force from the hydraulic fluid that causes the shaft assembly to move relative to the hydraulic cylinder. Moreover, the hydraulic cylinder assembly includes a plurality of sealing members configured to extend radially between the hydraulic cylinder and the shaft assembly to separate the hydraulic cylinder into a first chamber having the first piston and a second chamber having the second piston. Further, the first chamber and the second chamber are fluidly isolated from each other.

In one embodiment, a hydraulic steering system of a work vehicle includes a hydraulic cylinder assembly configured to receive hydraulic fluid. The hydraulic cylinder assembly includes a hydraulic cylinder having a first longitudinal end portion and a second longitudinal end portion. The hydraulic cylinder assembly also includes a shaft assembly disposed within the hydraulic cylinder. The shaft assembly includes a first shaft part extending within the hydraulic cylinder. Additionally, the first shaft part includes a first diameter for a first portion of the first shaft part, a second diameter for a second portion of the first shaft part, and a third diameter for a third portion of the first shaft part. Moreover, the first shaft part includes a first piston integrally formed with the first shaft part between the first portion and the second portion of the first shaft part, and configured to receive a first force from the hydraulic fluid that causes the shaft assembly to move relative to the hydraulic cylinder. A radially-outer surface of the first shaft part further includes a first threaded portion disposed between the second portion and the third portion of the first shaft part. The shaft assembly also includes a second shaft part including a second piston configured to receive a second force from the hydraulic fluid that causes the shaft assembly to move relative to the hydraulic cylinder. Moreover, a radially-inner surface of the second shaft part includes a second threaded portion, and the second threaded portion is threaded into the first threaded portion to connect the second shaft part to the first shaft part. Additionally, the hydraulic cylinder assembly includes a plurality of sealing members configured to extend radially between the hydraulic cylinder and the shaft assembly to separate the hydraulic cylinder into a first chamber having the first piston and a second chamber having the second piston. Further, the first chamber and the second chamber are fluidly isolated from each other. Moreover, the plurality of sealing members includes a first gland disposed on the first longitudinal end portion of the hydraulic cylinder, a second gland disposed on the second longitudinal end portion of the hydraulic cylinder, and a seal disposed within the hydraulic cylinder between the first piston and the second piston.

In one embodiment, a method of manufacturing a hydraulic cylinder assembly for a hydraulic steering system includes disposing an annular sealing member within a hydraulic cylinder of the hydraulic cylinder assembly. The method includes disposing a first shaft part including a first piston and a channel extending longitudinally into a respective end portion of the first shaft part within the hydraulic cylinder, and disposing a second shaft part including a second piston and an extension extending longitudinally from a respective end portion of the second shaft part within the hydraulic cylinder. Additionally, the method includes coupling the second shaft part to the first shaft part within the hydraulic cylinder by disposing the extension of the second shaft part within the channel of the first shaft part. Moreover, at least one of the first shaft part or the second shaft part extends through the annular sealing member. The method further includes disposing a first gland on a first longitudinal end portion of the hydraulic cylinder to form a first chamber including the first piston, and disposing a second gland on a second longitudinal end portion of the hydraulic cylinder to form a second chamber including the second piston.

DRAWINGS

These and other features, aspects, and advantages of the present disclosure will become better understood when the following detailed description is read with reference to the accompanying drawings in which like characters represent like parts throughout the drawings, wherein:

FIG. 5 is a cross-sectional front view of an embodiment of a shaft assembly having multiple shaft parts that may be disposed within a hydraulic cylinder of the hydraulic cylinder assembly of FIG. 4;

FIG. 6 is a cross-sectional front view of an embodiment of a portion of the shaft assembly of FIG. 5 taken within line 6-6;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments disclosed herein relate generally to a hydraulic steering system driven by a hydraulic cylinder assembly having multiple hydraulic chambers (e.g., multiple axial hydraulic chambers). The hydraulic cylinder assembly includes a hydraulic cylinder, a shaft assembly disposed within the hydraulic cylinder, and sealing members that define hydraulic chambers within the hydraulic cylinder. The shaft assembly may be formed from multiple shaft parts to enable the shaft assembly to be assembled around one or more middle seals within the hydraulic cylinder. The shaft assembly also includes multiple pistons disposed within respective hydraulic chambers. The pistons are each configured to receive forces from hydraulic fluid selectively applied to the hydraulic chambers. Based on the selective application of the hydraulic fluid, the forces on the pistons move the shaft assembly relative to the hydraulic cylinder. In certain embodiments, because longitudinal ends of the shaft assembly are coupled to steering knuckles of a work vehicle, the movement of the shaft assembly enables steering of the work vehicle. By having multiple pistons within multiple hydraulic chambers, the hydraulic steering system may employ greater steering forces for a given diameter of the hydraulic cylinder.

Figure 1:
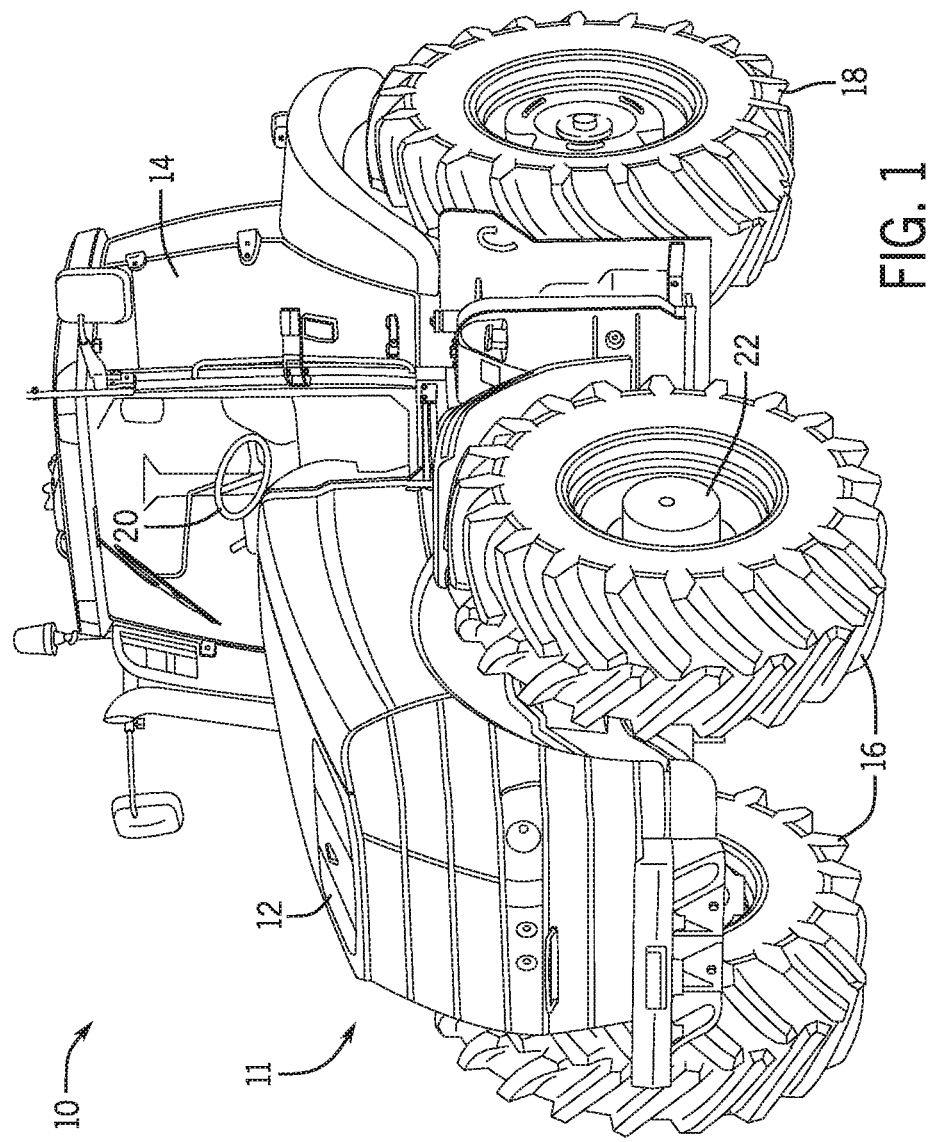
FIG. 1 is a perspective view of an embodiment of a work vehicle that includes a hydraulic steering system.

Turning now to the drawings, FIG. 1 is a perspective view of an embodiment of a work vehicle 10 that includes a hydraulic steering system 11. In the illustrated embodiment, the work vehicle 10 includes a frame 12 configured to house an engine, a transmission, and/or other systems of the work vehicle 10. As shown, the work vehicle 10 includes a cab 14 configured to house an operator. Moreover, the work vehicle 10 includes front wheels 16 and back wheels 18 configured to be driven by the engine and transmission, thereby driving the work vehicle 10 along a field, a road, or any other suitable surface. The operator may steer the work vehicle 10 by manipulating or providing an input to a controller 20 within the cab 14. In the illustrated embodiment, the controller 20 is a steering wheel. However, it is to be understood that the work vehicle 10 may be steered by any suitable controlling device, such as an electronic controlling device located within the work vehicle 10 or remote from the work vehicle 10. As discussed in detail below, the work vehicle 10 includes the hydraulic steering system 11 that adjusts a hydraulic fluid in response to inputs at the controller 20 to provide hydraulic steering to the work vehicle 10. In certain embodiments, when using the hydraulic steering system 11, the operator may steer the work vehicle 10 more easily compared to work vehicles without a hydraulic steering system. While the illustrated work vehicle 10 is a tractor, it should be appreciated that the hydraulic steering system 11 described herein may be employed within any suitable vehicle or work vehicle, such as a truck, a harvester, a sprayer, or a skid steer. Furthermore, the work vehicle 10 may be configured to be remotely controlled and/or to operate autonomously.

Figure 2:
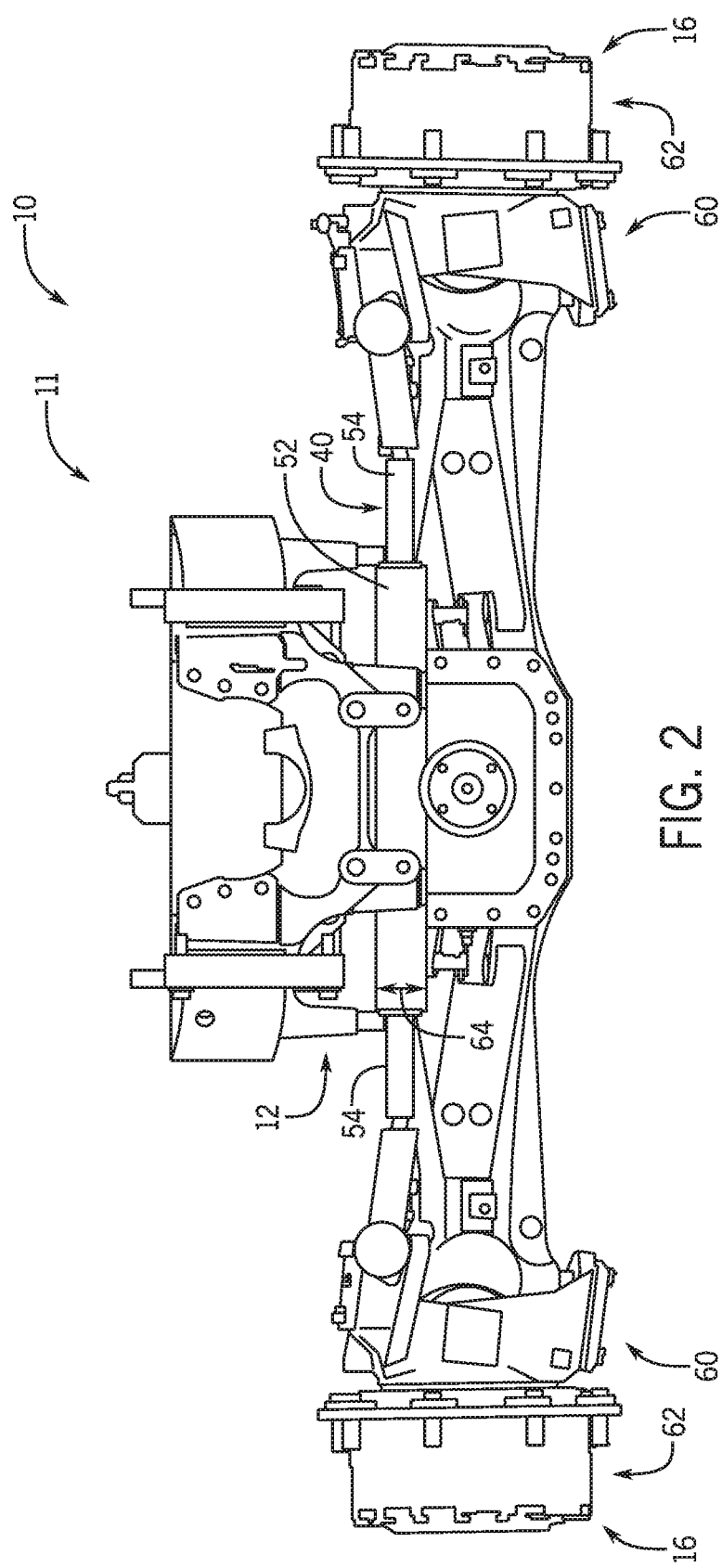
FIG. 2 is a front view of an embodiment of the hydraulic steering system of FIG. 1.

FIG. 2 is a front view of an embodiment of the hydraulic steering system 11 of FIG. 1. The hydraulic steering system 11 includes a hydraulic cylinder assembly 40 positioned between the frame 12 of the work vehicle 10 and the front wheels 16 of the work vehicle 10.

As shown, the hydraulic steering system 11 includes the hydraulic cylinder assembly 40. The hydraulic cylinder assembly 40 includes a hydraulic cylinder 52, a shaft assembly 54 disposed within the hydraulic cylinder 52 (e.g., a one-piece cylinder or gaplessly continuous cylinder), and sealing members to maintain hydraulic fluid within hydraulic chambers of the hydraulic cylinder 52. As will be discussed in more detail below, the shaft assembly 54 may include multiple shaft parts that are coupled together within the hydraulic cylinder 52. The shaft assembly 54 additionally includes a piston disposed in each hydraulic chamber to receive forces applied by the hydraulic fluid. By including a piston disposed within each hydraulic chamber of the hydraulic cylinder 52, the hydraulic steering system 11 may provide a greater steering force compared to a steering system having a hydraulic cylinder of a similar diameter, but without multiple hydraulic chambers and pistons.

In operation, to steer the work vehicle 10, the operator adjusts the controller 20 (FIG. 1) to control a control valve fluidly coupled to a hydraulic fluid reservoir and the hydraulic cylinder 52. Accordingly, controlling the control valve enables the hydraulic fluid to flow into the hydraulic cylinder 52 and drive the pistons to move the shaft assembly 54 within the hydraulic cylinder 52. The shaft assembly 54 is pivotally coupled to steering knuckles 60, which receive the steering forces and deliver the steering forces to wheel portions 62 of the front wheels 16. By using multiple hydraulic chambers within the hydraulic cylinder 52, the shaft assembly 54 may apply a greater steering force to the steering knuckles 60 for a given diameter 64 of the hydraulic cylinder 52. Thus, the techniques disclosed herein enable hydraulic cylinder assemblies to have smaller diameters and/or greater steering power, thus increasing the effectiveness of hydraulic steering systems within high power vehicles, such as the work vehicle 10.

Figure 3:
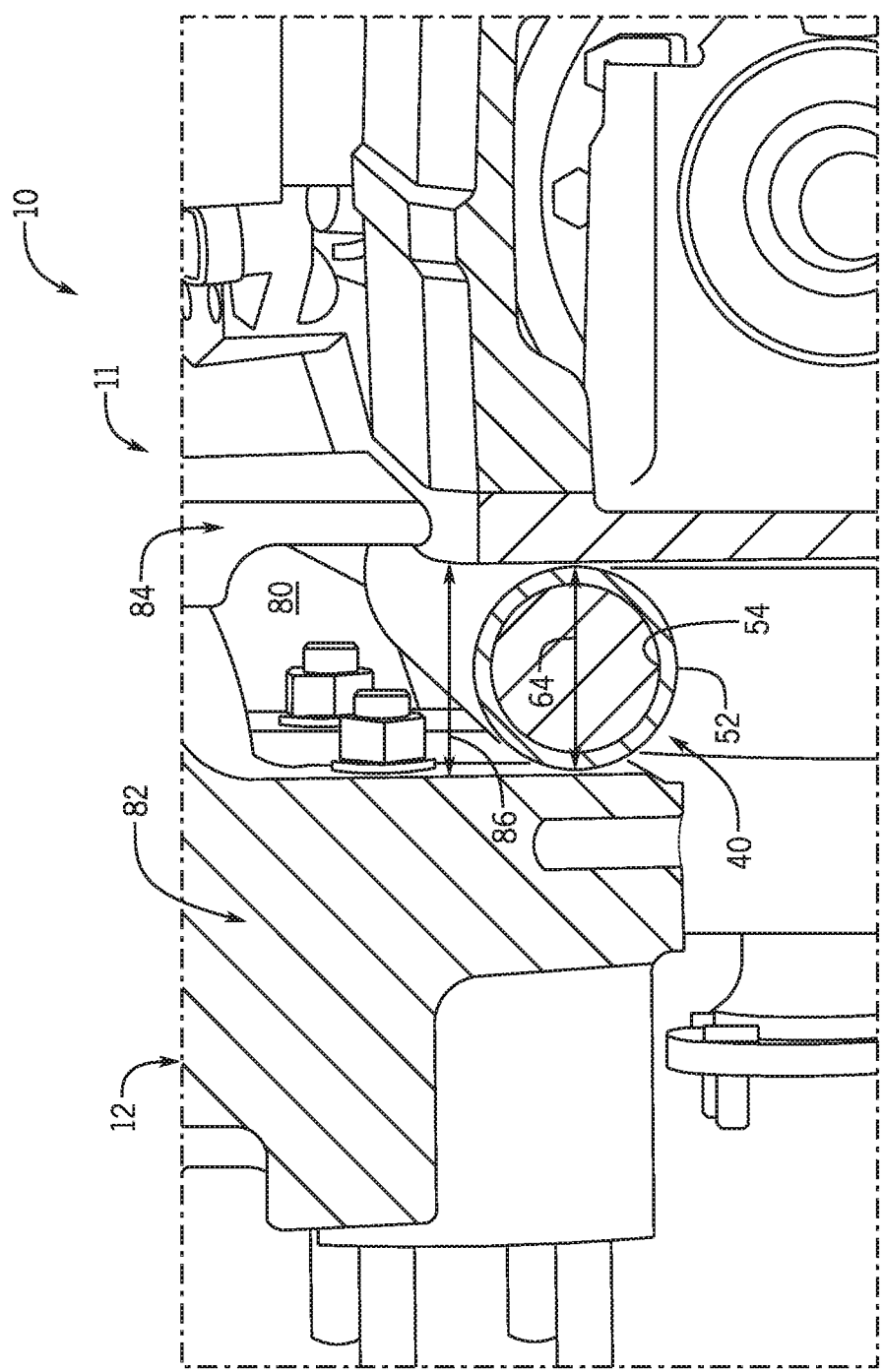
FIG. 3 is a cross-sectional side view of an embodiment of a portion of the hydraulic steering system coupled to the work vehicle of FIG. 1.

FIG. 3 is a cross-sectional side view of an embodiment of the hydraulic cylinder assembly 40 coupled to the work vehicle 10 of FIG. 1. In some embodiments, the hydraulic cylinder 52 of the hydraulic cylinder assembly 40 is disposed within a physically restricted space. For example, as shown, the hydraulic cylinder 52 is disposed within a space 80 defined between a first portion 82 and a second portion 84 of the frame 12 of the work vehicle 10. In certain embodiments, the hydraulic cylinder 52 is rigidly coupled to the frame 12, such that when the shaft assembly 54 moves relative to the hydraulic cylinder 52, the shaft assembly 54 also moves relative to the frame 12. Moreover, the first portion 82 and the second portion 84 are separated by a width 86 that may generally limit the diameter 64 of the hydraulic cylinder 52. Thus, in some embodiments, the space 80 to receive the hydraulic cylinder 52 is physically restricted, such that if more steering power is desired, the hydraulic cylinder 52 may not be easily increased in diameter 64 without also adjusting the portions 82, 84 or other features of the frame 12 of the work vehicle 10.

As noted above, the hydraulic cylinder 52 of the hydraulic cylinder assembly 40 includes multiple hydraulic chambers that enable the hydraulic cylinder 52 to have the diameter 64 to fit within the space 80 of the frame 12, while also providing suitable steering capabilities. In some embodiments, the hydraulic cylinder 52 may increase a steering force of the hydraulic steering system 11 within the work vehicle 10 compared to a hydraulic cylinder without multiple hydraulic chambers.

Figure 4:
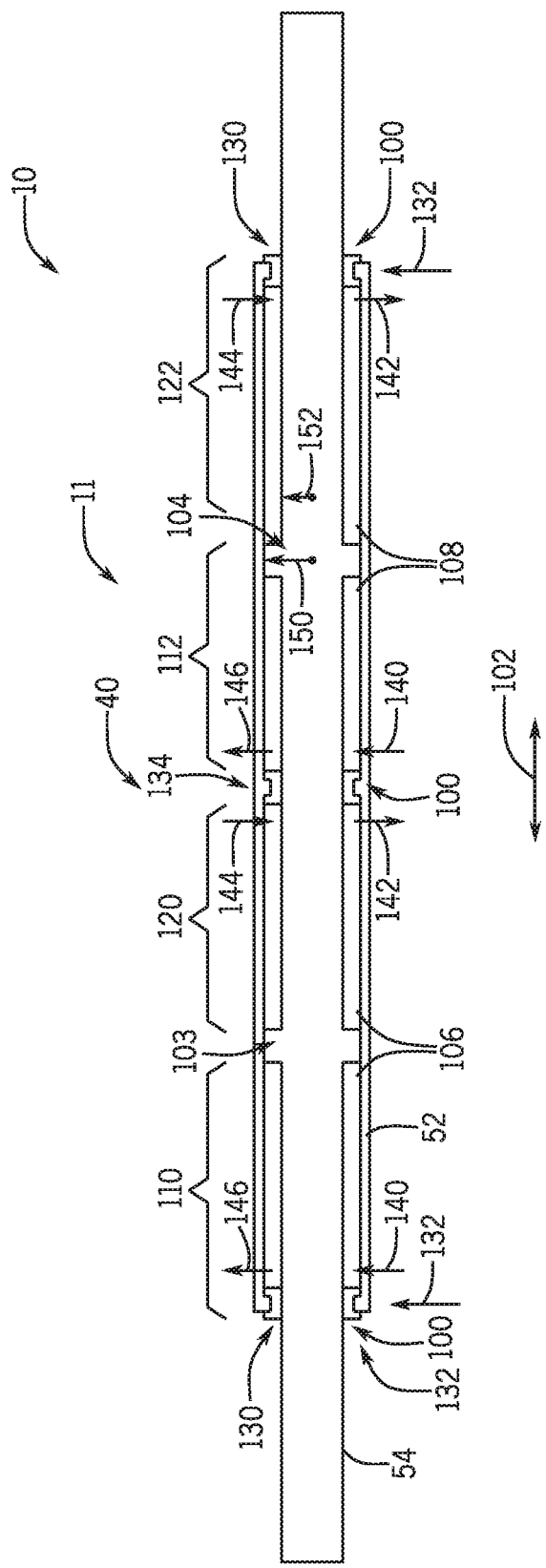
FIG. 4 is a cross-sectional front view of an embodiment of a hydraulic cylinder assembly of the hydraulic steering system of FIG. 1.

FIG. 4 is a cross-sectional view of an embodiment of the hydraulic cylinder assembly 40 that may be employed within the hydraulic steering system 11 of FIG. 1. As shown, the hydraulic cylinder assembly 40 includes the hydraulic cylinder 52, the shaft assembly 54 disposed therein, and sealing members 100. The shaft assembly 54 extends within the hydraulic cylinder 52 along a longitudinal axis 102. Additionally, the shaft assembly 54 may be formed from multiple shaft parts that are coupled together within the hydraulic cylinder 52. Further, the shaft assembly 54 includes a first piston 103 (e.g., annular or radially-expanded portion) and a second piston 104 (e.g., annular or radially-expanded portion) that extend radially from the shaft assembly 54. In some embodiments, one or both of the first piston 103 and the second piston 104 are integrally formed (e.g., gaplessly continuous piece) with the shaft assembly 54 or attached to the shaft assembly 54 by welding, threads, fasteners, or another suitable attachment method.

In some embodiments, the sealing members 100 and the hydraulic cylinder 52 define a first hydraulic chamber 106 (e.g., first chamber) and a second hydraulic chamber 108 (e.g., second chamber) within the hydraulic cylinder 52. The sealing members 100 extend radially between, contact, and seal against the hydraulic cylinder 52 and the shaft assembly 54 to retain hydraulic fluid within the hydraulic chambers 106, 108 to enable hydraulic steering of the work vehicle 10. As shown, the sealing members 100 include glands 130 disposed at longitudinal ends 132 of the hydraulic cylinder 52. Additionally, in some embodiments, a middle seal 134 is disposed between the glands 130. Hydraulic fluid supplied to the hydraulic chambers 106, 108 may therefore be completely or substantially blocked from leaking between or from the hydraulic chambers 106, 108. That is, the hydraulic chambers 106, 108 may be fluidly isolated. As shown, the hydraulic cylinder 52 may be one continuous piece between longitudinal ends 132 and/or across both hydraulic chambers 106, 108.

Moreover, in certain embodiments, each piston of the shaft assembly 54 is disposed within a respective hydraulic chamber defined within the hydraulic cylinder 52. For example, the first piston 103 is disposed within the first hydraulic chamber 106 and the second piston 104 is disposed within the second hydraulic chamber 108. In some embodiments, hydraulic fluid is selectively applied to the first hydraulic chamber 106 and the second hydraulic chamber 108 to cause the shaft assembly 54 to move along the longitudinal axis 102. That is, the hydraulic fluid supplied to a left portion 110 of the first hydraulic chamber 106 and to a left portion 112 of the second hydraulic chamber 108 pushes against a left side of the first piston 103 and a left side of the second piston 104. The hydraulic force of the hydraulic fluid thus drives the shaft assembly 54 to the right. Alternatively, hydraulic fluid may be supplied to a right portion 120 of the first hydraulic chamber 106 and to a right portion 122 of the second hydraulic chamber 108 to push against a right side of the first piston 103 and a right the second piston 104, thus driving the shaft assembly 54 to the left.

In certain embodiments, the hydraulic fluid is supplied to the left portions 110, 112 of the hydraulic chambers 106, 108 via left hydraulic fluid inlets 140, while hydraulic fluid in the right portions 120, 122 is removed via right fluid outlets 142. Similarly, the hydraulic fluid is supplied to the right portions 120, 122 of the hydraulic chambers 106, 108 via right hydraulic fluid inlets 144, while hydraulic fluid in the left portions 110, 112 is removed via left fluid outlets 146. Movement of the shaft assembly 54 relative to the hydraulic cylinder 52 causes resulting movements in the steering knuckles and the front wheels of the work vehicle 10, thus enabling steering of the work vehicle 10.

When steering the work vehicle 10, hydraulic steering system 11 supplies hydraulic fluid to the hydraulic chambers 106, 108 and the hydraulic fluid pushes on the pistons 103, 104. It is to be understood that because there are two pistons within the hydraulic cylinder assembly 40, the present hydraulic cylinder assembly generates approximately twice the steering power of a hydraulic cylinder assembly of the same diameter having only one piston. In particular, the force exerted on each piston 103, 104 within each hydraulic chamber 106, 108 is proportional to the pressure of the hydraulic fluid therein multiplied by the surface area of the piston therein. More particularly, the force F applied to a piston by hydraulic fluid is given by Equation 1 below:

$$F = P * A \quad (1)$$

in which P is the hydraulic pressure and A is the exposed surface area of a given piston. Thus, in embodiments having two or more hydraulic chambers, Equation 1 is applicable for each hydraulic chamber.

In some embodiments, the exposed surface area of the piston is an annular ring, given by Equation 2 below:

$$A = pi * (R_{piston}^2 - R_{shaft}^2) \quad (2)$$

in which $R_{piston}$ is the outer radius of the piston, shown by reference number 150, and $R_{shaft}$ is the outer radius of the shaft, shown by reference number 152.

As may be understood from the above equations, the multi-chambered hydraulic cylinder assembly 40, which includes both the first piston 103 and the second piston 104, may include twice the exposed surface area to the hydraulic fluid. Thus, for a given pressure of hydraulic fluid, the shaft assembly 54 may receive twice the force for steering the work vehicle 10. Further, it is to be understood that the above benefits discussed for a multi-chambered shaft assembly having two pistons inside two hydraulic chambers may be extended to multi-chambered shaft assemblies having three, four, five, or more pistons respectively inside three, four, five, or more hydraulic chambers.

Due to the configuration of the components of the hydraulic cylinder assembly 40, (e.g., the position and geometry of the pistons 103, 104 and the middle seal 134), various steps may be taken to assemble the hydraulic cylinder assembly 40. FIGS. 5-10 illustrate various features and steps that may facilitate assembly of the hydraulic cylinder assembly 40 that may be used within the work vehicle 10. As such, the shaft assembly 54 of FIG. 4 may be assembled via several different techniques. For example, FIG. 5 is a cross-sectional view of an embodiment of a shaft assembly 160 having multiple shaft parts that may be disposed within the hydraulic cylinder 52 of FIG. 4. As shown, a first shaft part 162 and a second shaft part 164 are coupled together to form the shaft assembly 160. In the illustrated embodiment, the first shaft part 162 includes a channel 166 (e.g., recess) that extends longitudinally into a longitudinal side 168 of the first shaft part 162. The first shaft part 162 also includes a first piston 170 (e.g., integrally formed) at the longitudinal end 172 of the first shaft part 162.

Additionally, the second shaft part 164 includes an extension 180 that extends within at least a portion of the channel 166 of the first shaft part 162. The extension 180 is formed at a longitudinal end 182 of the second shaft part 164. As shown, the extension 180 is coupled within the channel 166 to couple the first shaft part 162 to the second shaft part 164. In certain embodiments, the extension 180 does not occupy the entirety of the channel 166, instead leaving a space 184 defined between an inner surface 186 (e.g., walls) of the channel 166 and the extension 180. Moreover, a second piston 188 is provided on the second shaft part 164.

In certain embodiments, the shaft parts 162, 164 are assembled to form the shaft assembly 160 within a hydraulic cylinder, such as the hydraulic cylinder 52 (FIG. 4). For example, the middle seal 134 may be placed within the hydraulic cylinder. Then, the first shaft part 162 and the second shaft part 164 may be placed within the hydraulic cylinder 52. Next, first shaft part 162 and the second shaft part 164 may be coupled together. Then, the glands 130 are disposed at the longitudinal ends 132 of the hydraulic cylinder 52. However, in certain embodiments, the components of the shaft assembly 160 may be assembled in another suitable order. For example, the middle seal 134 may be disposed around the second shaft part 164, instead of in the hydraulic cylinder 52 and/or the first shaft part 162 may be placed within the hydraulic cylinder 52 before the second shaft part 162.

FIG. 6 is a cross-sectional front view of an embodiment of a portion of the shaft assembly 160 of FIG. 5 taken within line 6-6. As shown, the first shaft part 162 is coupled to the second shaft part 164. By having multiple shaft parts, the shaft assembly 160 may be assembled and used in physically restricted environments. As noted above, in multi-chambered hydraulic cylinders having narrow longitudinal openings or a middle seal disposed therein, disposing a one-piece multi-pistoned shaft though the multi-chambered hydraulic cylinder may be difficult or impractical.

As shown, the first and second shaft parts 162, 164 include coupling features to enable the first and second shaft parts 162, 164 to connect together. For example, the first shaft part 162 includes a first circumferential groove 200 (e.g., extending about all or a part of a circumference) and the second shaft part 164 includes a corresponding second circumferential groove 202. The first circumferential groove 200 is a recess defined within the inner surface 186 of the first shaft part 162, and the second circumferential groove 202 is a recess defined within an outer surface 204 of the second shaft part 164. In certain embodiments, the circumferential grooves 200, 202 are mirror images of one another, though it is to be understood that the circumferential grooves 200, 202 may have any other suitable shape.

A coupling element, such as a snap ring 210 (e.g., annular snap ring), may be disposed within the circumferential grooves 200, 202 to retain the connection between the shaft parts 162, 164. With the snap ring 210 disposed within the circumferential grooves 200, 202, the first shaft part 162 is blocked from moving relative to the second shaft part 164. In certain embodiments, the snap ring 210 includes elastomeric materials, plastic materials, metal materials, and/or another suitable material for retaining the shaft parts 162, 164 together. In certain embodiments, although described as a snap ring 210, the coupling element may be of another suitable form, such as a retaining ring. In some embodiments, the coupling may include a threaded interface, such that the shaft parts 162, 164 are threadably coupled to one another.

Further, in certain embodiments, a chamfer 214 is defined between the longitudinal side 168 and the inner surface 186 of the first shaft part 162. In certain embodiments, the chamfer 214 is a sloping edge, formed by removing a portion of the edge between the longitudinal side 168 and the inner surface 186 of the first shaft part 162. The chamfer 214 may be defined around all or a portion of an inner circumference 216 of the first shaft part 162. Thus, in certain embodiments, a space 218 is defined between the chamfer 214 and the second shaft part 164.

To reduce entry of hydraulic fluid within the channel 166 and/or reduce hydraulic fluid within the space 184, a sealing member, such as an O-ring 220 (e.g., annular seal), may be disposed within the space 218 defined between the chamfer 214 and the second shaft part 164. Additionally or alternatively, a sealing member such as the O-ring 220 may be included around the extension 180 to reduce hydraulic fluid within the space 184. Similar to the snap ring 210, the O-ring 220 may be disposed within one or more circumferential grooves. In some embodiments, the O-ring 220 is disposed around the extension 180 at a longitudinal position between the snap ring 210 and the chamfer 214. The O-ring 220 may be formed of a suitable elastic material that is compressed within the space 218 to reduce a flow of the hydraulic fluid into the channel 166. In certain embodiments, the O-ring 220 reduces a pressure of hydraulic fluid that may otherwise enter the channel 166 and push on the extension 180 along the longitudinal axis 102. Accordingly, all or a portion of the space 218 may be occupied with the O-ring 220 to block the hydraulic fluid from separating the shaft parts 162, 164 from one another. In some embodiments, the sealing member may take the form of another suitable elastomeric component or be disposed at another suitable location, such as in a groove disposed within the longitudinal side 168 of the first shaft part 162 around the channel 166.

While the chamfer 214 is shown between the inner surface 186 of the channel 166 and the longitudinal side 168 of the first shaft part 162, it is to be understood that another feature may be employed on the first shaft part 162. For example, the first shaft part 162 may include a fillet or rounded surface shaped between the inner surface 186 of the channel 166 and the longitudinal side 168 of the first shaft part 162. Moreover, a bevel may be disposed at the longitudinal side 168 of the first shaft part 162. Additionally, the O-ring 220 may be adjusted or multiple O-rings may be disposed within the space 218 to reduce entry of hydraulic fluid within a channel having a different feature than the chamfer 214.

With the above understanding of the components of the shaft assembly 160, the following method of assembling the shaft assembly 160 within a hydraulic cylinder, such as the hydraulic cylinder 52 of FIG. 4, may be more readily understood. For example, after the middle seal 134 (e.g., seal member, annular seal member) is disposed and secured within the hydraulic cylinder 52, the snap ring 210 may be disposed within the second circumferential groove 202 of the extension 180. Moreover, the O-ring 220 may be disposed around the extension 180 (e.g., at a position between the snap-ring 210 and the shoulder of the second shaft part, at a base of the extension 180). Next, the first shaft part 162 is positioned at a first longitudinal end 132 of the hydraulic cylinder 52, such that the channel 166 is on a first side of and is facing the middle seal 134. Additionally, the second shaft part 164 is positioned at a second longitudinal end 132 of the hydraulic cylinder 52, such that the extension 180 is on a second side of and is facing the middle seal 134. Subsequently, the first and second shaft parts 162, 164 are pushed toward one another within the hydraulic cylinder 52, so that the extension 180 enters the channel 166.

As the extension 180 is pushed within the channel 166, the chamfer 214 between the longitudinal side 168 of the first shaft part 162 and the channel 166 compresses the snap ring 210 within the second circumferential groove 202 of the extension 180. Then, the extension 180 is disposed further within the channel 166 until the first circumferential groove 200 of the first shaft part 162 aligns with or is disposed opposite of the second circumferential groove 202. When the compressed snap ring 210 within the second circumferential groove 202 is exposed to open space within the first circumferential groove 200, the snap ring 210 decompresses and expands within the second circumferential groove 202. Accordingly, the snap ring 210 retains the extension 180 within the channel 166, thus coupling the first shaft part 162 and the second shaft part 164 together. Moreover, the O-ring 220 may remain outside of the channel 166 and be compressed between the chamfer 214 and the second shaft part 164. Additionally or alternatively, if two of the O-rings 220 are included, the O-ring may be disposed in circumferential grooves similar to the snap ring 210, such that during assembly, the O-ring 220 is also compressed into place by the chamfer 214. When coupled together in this manner, the middle seal 134 remains in place within the hydraulic cylinder 52 between the first and second pistons 170, 188.

To complete assembly of the hydraulic cylinder assembly having the shaft assembly 160, a first longitudinal gland 130 is disposed around the first shaft part 162 and coupled to the first longitudinal end 132 of the hydraulic cylinder 52 to form the first hydraulic chamber 106. Additionally, a second longitudinal gland 130 is disposed around the second shaft part 164 and coupled to the second longitudinal end 132 of the hydraulic cylinder to form the second hydraulic chamber 108. Thus, by including multiple shaft parts, the shaft assembly 160 may be readily assembled within a hydraulic cylinder to form a multi-chambered hydraulic cylinder useful for increasing steering force without increasing a diameter of the hydraulic cylinder. Moreover, the shaft assembly 160 may be adapted to include more than two hydraulic chambers and pistons by including a desired quantity of suitable channels, extensions, and snap rings at longitudinal ends of shaft parts.

Figure 7:
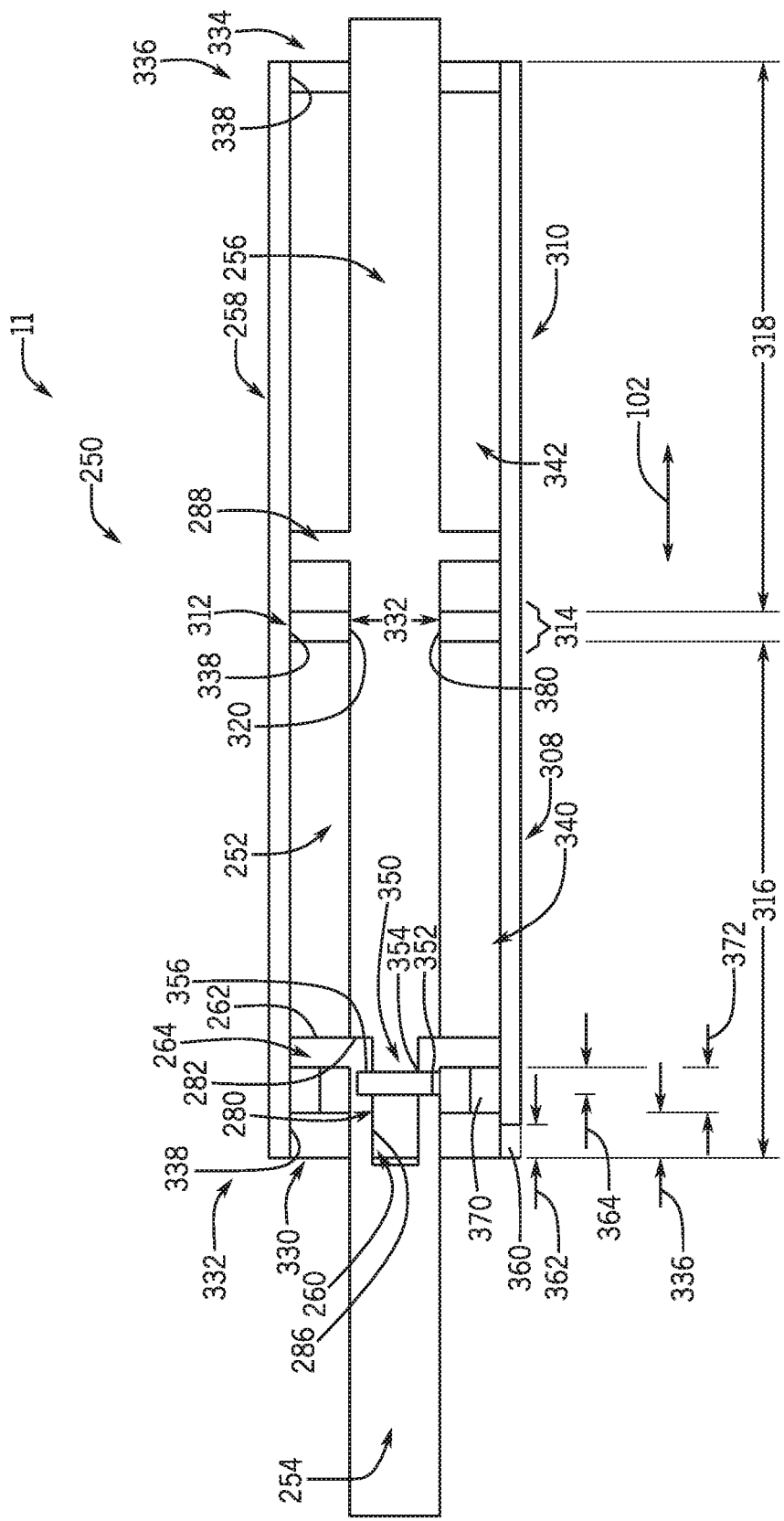
FIG. 7 is a cross-sectional front view of an embodiment of a hydraulic cylinder assembly that may be used within the hydraulic steering system of FIG. 1.

FIG. 7 is a cross-sectional front view of an embodiment of a hydraulic cylinder assembly 250 that may be used within the hydraulic steering system 11 of FIG. 1. The hydraulic cylinder assembly 250 includes a shaft assembly 252 and sealing members within a hydraulic cylinder 258 (e.g., a one-piece or gaplessly continuous cylinder). As shown, the shaft assembly 252 includes a first shaft part 254 and a second shaft part 256. In certain embodiments, as discussed below, the shaft parts 254, 256 are coupled together within the hydraulic cylinder 258. Similar to the first shaft part 162 of FIGS. 5 and 6, the first shaft part 254 includes a channel 260 (e.g., recess) that extends longitudinally through a longitudinal end 262 of the first shaft part 254. The first shaft part 254 also includes a first piston 264 (e.g., integrally formed) at a longitudinal end 266 of the first shaft part 254.

Additionally, similar to the second shaft part 164 of FIGS. 5 and 6, the second shaft part 256 includes an extension 280 that is configured to extend within at least a portion of the channel 260 of the first shaft part 254. The extension 280 is formed on a longitudinal end 282 (e.g., shoulder) of the second shaft part 256. Additionally, in certain embodiments, the extension 280 is retained within the channel 260. In certain embodiments, the extension 280 occupies all or most of the channel 260, though in other embodiments a space be defined between an inner surface 286 (e.g., inner walls) of the channel 260 and the extension 280. In certain embodiments, a second piston 288 is provided on the second shaft part 256.

The hydraulic cylinder assembly 250 additionally includes sealing members to retain hydraulic fluid within the hydraulic cylinder 258. For example, in some embodiments, the hydraulic cylinder assembly 250 includes a middle seal 312 (e.g., annular seal) disposed at or near a middle portion 314 of the hydraulic cylinder 258. In certain embodiments, the middle seal is not centered within the hydraulic cylinder 258. That is, a first portion 308 of the hydraulic cylinder 258 may include a first length 316 that is longer than a second length 318 of a second portion 310 of the hydraulic cylinder 258. Additionally, glands (e.g., annular seals) are disposed at longitudinal ends of the hydraulic cylinder 258 to define hydraulic chambers therein. For example, a first longitudinal gland 330 is disposed at a first longitudinal end 332 of the hydraulic cylinder 258 and a second longitudinal gland 334 is disposed at a second longitudinal end 336 of the hydraulic cylinder 258. In certain embodiments, the middle seal 312 and the longitudinal glands 330, 334 are coupled to an inner surface 338 of the hydraulic cylinder 258. Additionally or alternatively, the middle seal 312 and the longitudinal glands 330, 334 are injection molded, threaded, bolted, pinned, or otherwise affixed within the hydraulic cylinder 258.

In some embodiments, a first hydraulic chamber 340 is defined by the hydraulic cylinder 258, the first longitudinal gland 330, and the middle seal 312. Further, a second hydraulic chamber 342 is defined by the hydraulic cylinder 258, the middle seal 312, and the second longitudinal gland 334. Moreover, as shown, the first piston 264 is moveable within the first hydraulic chamber 340 and the second piston 288 is moveable within the second hydraulic chamber 342. As discussed above with reference to FIG. 4, hydraulic fluid inlets supply hydraulic fluid to left and right portions of the hydraulic chambers 340, 342 and hydraulic fluid outlets remove hydraulic fluid from the left and right portions of the hydraulic chambers 340, 342 to selectively move the shaft assembly 252 relative to the hydraulic cylinder 258.

As shown, the shaft parts 254, 256 are coupled together by a pin 350 disposed through the shaft parts 254, 256. In certain embodiments, the pin 350 extends (e.g., transverse to the longitudinal axis 102) through a first radial opening 352 of the first shaft part 254, through a radial opening 354 of the extension 280, and through a second radial opening 356 of the first shaft part 254. In some embodiments, the second radial opening 356 does not extend fully though the first shaft part 254, instead extending only partially therethrough. Further, the pin 350 may be press fit, adhered, welded, or attached within the shaft parts 254, 256 by another suitable fastening method. However, it is to be understood that another suitable fastener, such as a bolt, a screw, a nail, or a rod may be employed to couple the shaft parts 254, 256. Additionally, although only one pin 350 is shown here, other contemplated embodiments may employ 2, 3, 4, or more pins or fasteners to couple the shaft parts 254, 256.

In certain embodiments, a radial opening 360 is formed within the first longitudinal end 332 of the hydraulic cylinder 258. Moreover, the radial opening 360 has a width 362 that is at least as large as a width 364 of the pin 350 to enable insertion of the pin 350 to couple the first and second shaft parts 254, 256 to one another. Additionally, in certain embodiments, the first longitudinal gland 330 has a width 366 that is at least as large as the width 362 of the radial opening 360. Thus, during operation, the first longitudinal gland 330 blocks hydraulic fluid from traveling out of the radial opening 360 of the hydraulic cylinder 258, and thus retains the hydraulic fluid within the first hydraulic chamber 340.

Moreover, in certain embodiments, the hydraulic cylinder assembly 250 includes a spacer 370 disposed adjacent to the first longitudinal gland 330. In some embodiments, the spacer 370 is formed from an elastomeric material, a metal, an alloy, or another material suitable for blocking movement of the first piston 264 beyond the spacer 370. The spacer 370 may have a width 372 that is at least as large as the width 364 of the pin 350. Moreover, in certain embodiments, the first length 316 of the first portion 308 of the hydraulic cylinder 258 is longer than the second length 318 of the second portion 310 of the hydraulic cylinder 258 by the width 372 of the spacer 370. The spacer 370 is configured to give the pistons 264, 288 the same stroke length within respective hydraulic chambers 340, 342. As such, in certain embodiments, the hydraulic chambers 340, 342 have the same length. However, in other embodiments, the hydraulic chambers 340, 342 may be sized differently, such that the hydraulic chambers 340, 342 have different lengths.

During operation of the hydraulic steering system 11, the operator interacts with the controller 20 (FIG. 1) to adjust the application of hydraulic fluid within the hydraulic cylinder assembly 250. As shown in FIG. 7, the shaft assembly 252 is at a first position (e.g., end or limit position). In the first position, the pistons 264, 288 of the shaft assembly 252 may physically contact the first longitudinal gland 330 and/or the middle seal 312, respectively. As such, the shaft assembly 252 is physically blocked from moving relative to the hydraulic cylinder 258 further to the left along the longitudinal axis 102. By applying hydraulic fluid to the left of the pistons 264, 288, the hydraulic fluid pushes against the pistons 264, 288 and drives the shaft assembly 252 right along the longitudinal axis 102. From the first position, the shaft assembly 252 may move to the right to a second position (e.g., end or limit position), in which the right side of the first piston 264 contacts the middle seal 312 and the right side of the second piston contacts the second longitudinal gland 334. As discussed above, movement of the shaft assembly 252 relative to the hydraulic cylinder 258 results in steering of the work vehicle 10. Further, by employing two hydraulic chambers 340, 342 and two pistons 264, 288 therein, the hydraulic steering system 11 may generate more steering force for a given diameter of the hydraulic cylinder 258.

With the above understanding of the components of the shaft assembly 252, the following method of assembling the shaft assembly 252 within the hydraulic cylinder 258 to form the hydraulic cylinder assembly 250 may be more readily understood. In certain embodiments, to assemble the hydraulic cylinder assembly 250, first the middle seal 312 is disposed and coupled within the hydraulic cylinder 258. Next, the second shaft part 256 is disposed into the second longitudinal end 336 of the hydraulic cylinder 258, such that the extension 280 is positioned on a first side of and is facing the middle seal 312. Subsequently, the second shaft part 256 is pushed within the hydraulic cylinder 256 until the extension 280 passes through an opening 380 of the middle seal 312. The second shaft part 256 is driven within the hydraulic cylinder 258 until the second piston 288 abuts the middle seal 312 and reaches the first position.

After the second shaft part 256 is positioned such that the second piston 288 abuts the middle seal 312, the first shaft part 254 is disposed into the first longitudinal end 332 of the hydraulic cylinder 258, such that the channel 260 positioned on a second side of and is facing the middle seal 312. Additionally, the first shaft part 254 is positioned so that the channel 260 is disposed about the extension 280. In some embodiments, the first shaft part 254 and the second shaft part 256 are pushed together until the longitudinal end 282 of the second shaft part 256 abuts the longitudinal end 262 or first piston 264 of the first shaft part 254. At this position, the first radial opening 352 and the second radial opening 356 of the first shaft part 254 may be aligned with (e.g., radially opposite of, within a threshold distance of) the radial opening 354 of the second shaft part 256. Further, in certain embodiments, the radial openings 352, 354, 356 may also be aligned with the radial opening 360 of the hydraulic cylinder 258. In such embodiments, the second piston 288 and the second hydraulic chamber 342 may be suitably configured such that the second piston 288 may not contact the middle seal 312 during operation. In certain embodiments, the pin 350 may be easily disposed through the radial opening 360 and then through the radial openings 352, 354, 356. Accordingly, the pin 350 retains the extension 280 within the channel 260, thus coupling the first shaft part 254 and the second shaft part 256 together and maintaining the middle seal 312 between the first and second pistons 264, 288.

Next, the spacer 370 is disposed within the hydraulic cylinder 258 and coupled to the inner surface 338 of the hydraulic cylinder 258. Moreover, the first longitudinal gland 330 is disposed around the shaft assembly 252 and coupled to the inner surface 338 of the hydraulic cylinder at the first longitudinal end 332, thus forming the first hydraulic chamber 340. Further, the second longitudinal gland 334 is disposed around the shaft assembly 252 and coupled to the inner surface 338 of the hydraulic cylinder 258 at the second longitudinal end 336, thus forming the second hydraulic chamber 342. Because the first longitudinal gland 330 has the diameter 366 that is at least as large as the diameter 362 of the opening 360, the first longitudinal gland 330 blocks or restricts hydraulic fluid within the first hydraulic chamber 340 from leaking from the opening 360. Thus, by including multiple shaft parts, the shaft assembly 252 may be readily assembled within the hydraulic cylinder 258 to form the multi-chambered hydraulic cylinder assembly 250 useful for increasing steering force without increasing a diameter of the hydraulic cylinder 258.

Figure 8:
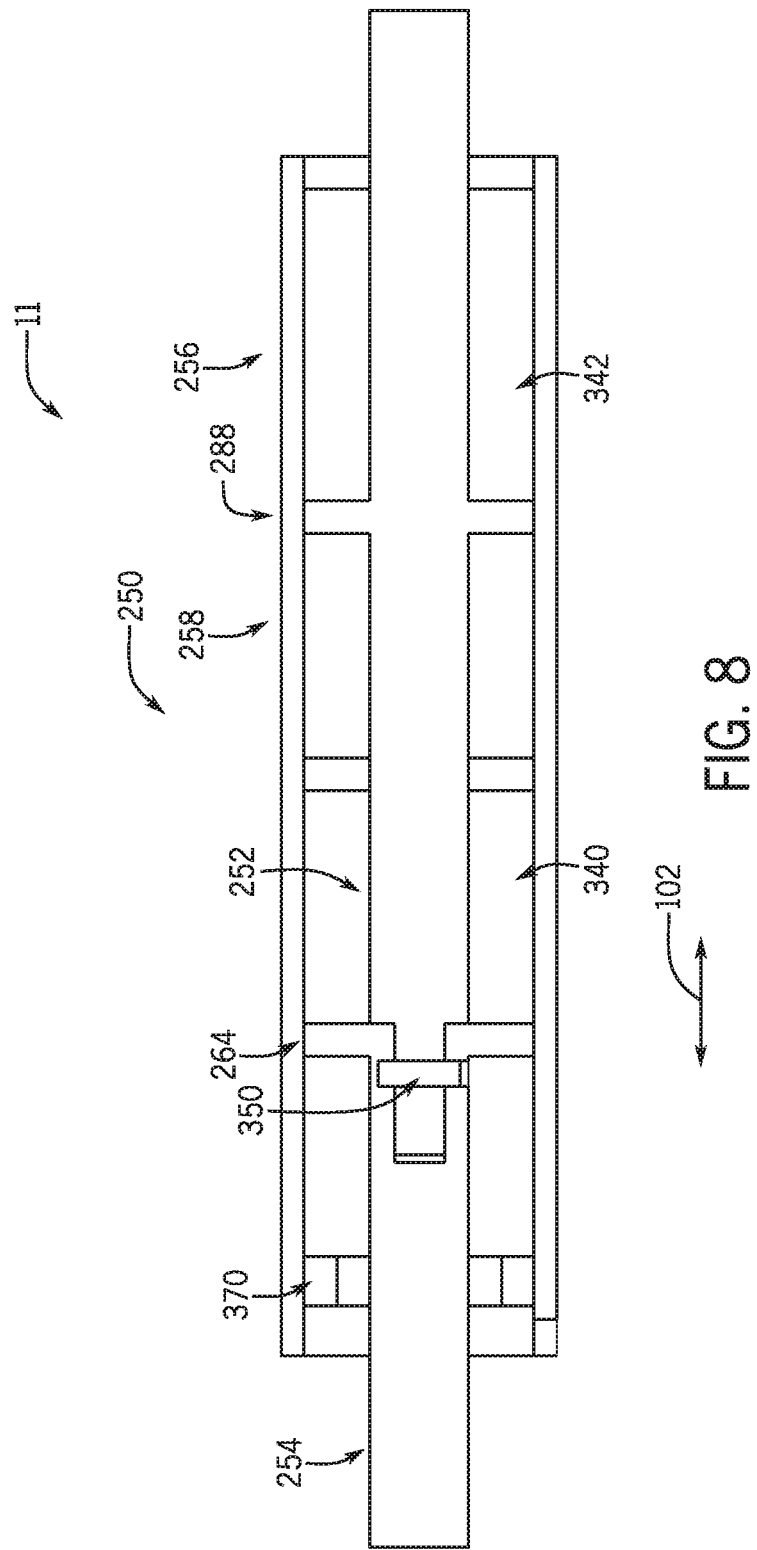
FIG. 8 is a cross-sectional front view of an embodiment of the hydraulic cylinder assembly of FIG. 7 having a shaft assembly in an intermediate position.

FIG. 8 is a cross-sectional front view of an embodiment of the hydraulic cylinder assembly 250 of FIG. 7 having the shaft assembly 252 in an intermediate position (e.g., between the first and second positions). As shown, the first shaft part 254 and the second shaft part 256 are coupled together within the hydraulic cylinder 258 by the pin 350 to form the shaft assembly 252. Moreover, the shaft assembly 252 is moveable relative to the hydraulic cylinder 258 to enable steering of the work vehicle 10. That is, based on selective application of hydraulic fluid, the pistons 264, 288 move within the hydraulic chambers 340, 342. As shown, the middle seal 312, the longitudinal glands 330, 334, and the spacer 370 are coupled within the hydraulic cylinder 258. As such, in certain embodiments, the middle seal 312, the longitudinal glands 330, 334, and the spacer 370 do not move based on the application of hydraulic fluid and/or movement of the shaft assembly 252.

Figure 9:
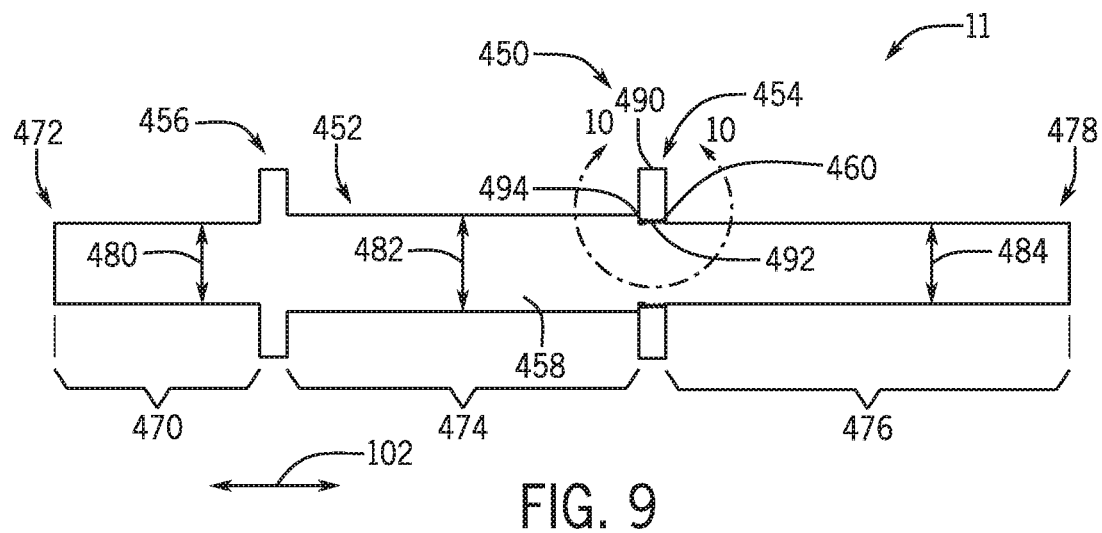
FIG. 9 is a cross-sectional front view of an embodiment of a shaft assembly that may be used within the hydraulic steering system of FIG. 1.

FIG. 9 is a cross-sectional front view of an embodiment of a shaft assembly 450 that may be used within the hydraulic steering system 11 of FIG. 1. In certain embodiments, the shaft assembly 450 is assembled within a hydraulic cylinder, such as the hydraulic cylinder 52, having sealing members to form a hydraulic cylinder assembly. As shown, the shaft assembly 450 includes a first shaft part 452 and a second shaft part 454. In certain embodiments, as discussed below, the shaft parts 452, 454 are coupled together within a hydraulic cylinder.

In certain embodiments, the first shaft part 452 is configured to extend within the hydraulic cylinder along the longitudinal axis 102. Further, the first shaft part 452 includes a first piston 456 that may be integrally formed on an outer surface 458 of the first shaft part 452. In certain embodiments, the first shaft part 452 also includes a first threaded portion 460. The first threaded portion 460 includes a circumferential swirl of raised ridges configured to receive and retain a corresponding threaded portion. Moreover, a first longitudinal portion 470 of the first shaft part 452 is defined between a first longitudinal end 472 of the first shaft part 452 and the first piston 456. A second longitudinal portion 474 of the first shaft part 452 is defined between the first piston 456 and the threaded portion 460. Additionally, a third longitudinal portion 476 is defined between the threaded portion 460 and a second longitudinal end 478 of the first shaft part 452. In certain embodiments, the first longitudinal portion 470 of the first shaft part 452 has a first diameter 480 that may correspond with a third diameter 484 of the third longitudinal portion 476. However, as will be discussed in more detail below with reference to FIG. 10, in certain embodiments, the second longitudinal portion 474 includes a second diameter 482 that is greater than the first diameter 480 and/or the third diameter 484.

In certain embodiments, the second shaft part 454 includes a second piston 490 (e.g., annular ring) having a second threaded portion 492 defined along an inner edge 494 of the second piston 490. The second threaded portion 492 corresponds to the first threaded portion 460 of the first shaft part 452. As such, in certain embodiments, the threaded portions 460, 492 are threaded together, such that the second shaft part 454 is retained proximate to the interface between the second longitudinal portion 474 and the third longitudinal portion 476 of the first shaft part 452.

Figure 10:
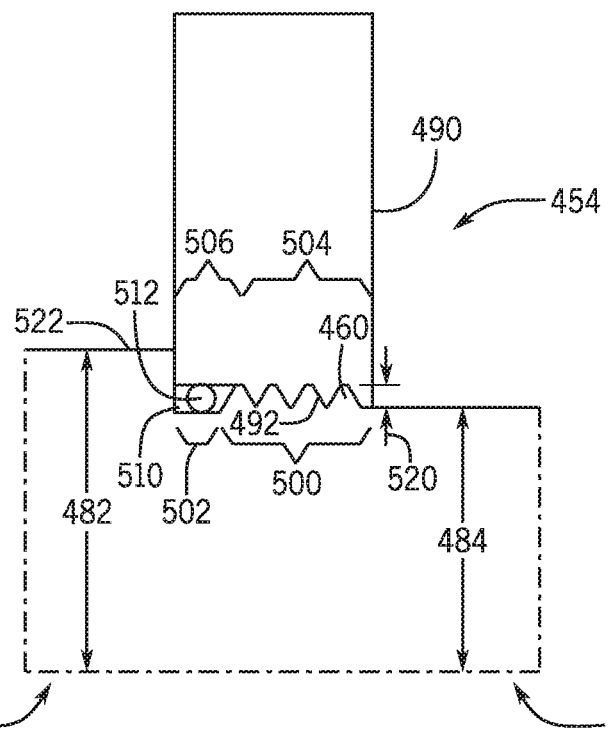
FIG. 10 is a cross-sectional front view of an embodiment of a portion of the shaft assembly of FIG. 9 taken within line 10-10.

FIG. 10 is a cross-sectional front view of an embodiment of a portion of the shaft assembly 450 of FIG. 9 taken within line 10-10. As shown, the first shaft part 452 is coupled to the second shaft part 454 by the threaded portions 460, 492. By having multiple shaft parts, the shaft assembly 450 may be used in otherwise physically restricted environments. For example, in multi-chambered hydraulic cylinders having narrow longitudinal openings or a seal disposed therein, disposing a one-piece multi-pistoned shaft though the multi-chambered hydraulic cylinder may be difficult or impractical.

In certain embodiments, the first threaded portion 460 includes a section of first threads 500 and a first smooth section 502 (e.g., non-threaded). Similarly, the second threaded portion 492 includes a section of second threads 504 and a second smooth section 506 (e.g., non-threaded). The first threads 500 interlock with the second threads 504, such that the second shaft part 454 is retained on the first shaft part 452. In certain embodiments, a space 510 (e.g., annular space) is defined between the smooth sections 502, 506. Further, in some embodiments, an O-ring 512 (e.g., annular seal) is disposed within the space 510 to sealingly block hydraulic fluid from leaking underneath the second shaft part 454 or across the interface between the second piston 490 and the first shaft part 452.

Further, in certain embodiments, the first threads 500 have a height 520 (e.g., radial height or dimension) from the third longitudinal portion 476 of the first shaft part 452. However, the second diameter 482 of the second longitudinal portion 474 of the first shaft part 452 is at least as large as the third diameter 484 of the third longitudinal portion 476 plus the height 520 of the first threads 500. That is, the first threads 500 may not extend beyond an upper surface 522 of the second longitudinal portion 474.

During operation of the hydraulic steering system 11 having the shaft assembly 450, hydraulic fluid is selectively applied to respective portions of hydraulic chambers of a hydraulic cylinder, such as the hydraulic cylinder 52 in FIGS. 2-4, having the pistons 456, 490 disposed therein. The hydraulic fluid pushes on longitudinal sides of the pistons 456, 490, thus moving the shaft assembly 450 relative to the hydraulic cylinder. Because the hydraulic cylinder may be rigidly coupled to the frame 12 of the work vehicle 10 while the shaft assembly 450 is movably coupled to the front wheels 16 of the work vehicle 10, movement of the shaft assembly 450 causes movement and steering of the front wheels 16. By including the first piston 456 within a first hydraulic chamber and the second piston 490 within a second hydraulic chamber, the hydraulic steering system 11 may provide greater steering force for a given diameter of the hydraulic cylinder.

With the above understanding of the components of the shaft assembly 450, the following method of assembling the shaft assembly 450 within the hydraulic cylinder, such as the hydraulic cylinder 52, may be more readily understood. In certain embodiments, the shaft parts 452, 454 are assembled to form the shaft assembly 450 within the hydraulic cylinder 52. That is, the middle seal 134 may be placed within the hydraulic cylinder 52. Additionally, the O-ring 512 is disposed around the first smooth portion 502 of the first shaft part 452. Then, the first shaft part 452 is disposed within the hydraulic cylinder and moved to a first position, such that the first threaded portion 460 is disposed through the middle seal 134 and the first piston 456 abuts the middle seal 134. Next, the second shaft part 454 is threaded onto the first shaft part 452 by rotating to engage the second threads 504 within the first threads 500. The shaft assembly 450 is therefore formed from the coupled shaft parts 452, 454 with the middle seal 134 between the first and second pistons 456, 490. Then, the glands 130 are disposed around the shaft assembly 450 and coupled at the longitudinal ends 132 of the hydraulic cylinder 52.

Moreover, because the first threads 500 do not extend radially beyond the upper surface 522 of the second longitudinal portion 474 of the first shaft part 452, the first threads 500 may not contact the middle seal 134 when the first threaded portion 460 is disposed through the middle seal 134 during assembly, thereby preserving a usable life of the middle seal 134. Additionally, in certain embodiments, the components of the shaft assembly 450 may be assembled in another order. For example, the second shaft part 454 may be disposed within the hydraulic cylinder 52 before the first shaft part 452 is at the first position, the O-ring 512 may be omitted, or the O-ring 512 may be disposed within the second shaft part 454 instead of around the first shaft part 452 during assembly. Additionally, in certain embodiments, more than two shaft parts are assembled within a hydraulic cylinder to form more than two hydraulic chambers. That is, a first shaft part may include additional threaded portions to receive more than one additional shaft part. In such embodiments, the first shaft part may include various longitudinal portions having various diameters to account for the height of the threaded portions.

Thus, the embodiments disclosed herein enable the hydraulic steering system to employ multiple hydraulic chambers having multiple pistons disposed therein to generate greater steering forces for a given diameter of the hydraulic cylinder of the hydraulic steering system. The shaft assembly may be formed from multiple shaft parts to enable the shaft assembly to be assembled around one or more middle seals within the hydraulic cylinder. Based on the selective application of the hydraulic fluid, the forces on the pistons move the shaft assembly relative to the hydraulic cylinder. In certain embodiments, because two hydraulic chambers are adjacent, the hydraulic steering system generates approximately twice the steering forces for a given diameter of the hydraulic cylinder. It should be understood that the various features in FIGS. 1-10 may be combined in any suitable manner.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A hydraulic steering system of a work vehicle, comprising:
 a hydraulic cylinder assembly configured to receive hydraulic fluid, wherein the hydraulic cylinder assembly comprises:
  a hydraulic cylinder comprising a first longitudinal end portion and a second longitudinal end portion;
  a shaft assembly disposed within the hydraulic cylinder, comprising:
   a first shaft part extending within the hydraulic cylinder and comprising a first piston integrally formed thereon, wherein the first piston is configured to receive a first force from the hydraulic fluid that causes the shaft assembly to move relative to the hydraulic cylinder; and
   a second shaft part extending within the hydraulic cylinder and comprising a second piston, wherein the second shaft part is coupled to the first shaft part, and the second piston is configured to receive a second force from the hydraulic fluid that causes the shaft assembly to move relative to the hydraulic cylinder,
  wherein the first shaft part and the second shaft part are coupled to one another via a snap ring; and
 a plurality of sealing members configured to extend radially between the hydraulic cylinder and the shaft assembly to separate the hydraulic cylinder into a first chamber comprising the first piston and a second chamber comprising the second piston, wherein the first chamber and the second chamber are fluidly isolated from each other.

2. The hydraulic steering system of claim 1, wherein the first shaft part comprises a channel extending into the first shaft part, and the second shaft part comprises an extension extending from a longitudinal end of the second shaft part and disposed within the channel of the first shaft part.

3. The hydraulic steering system of claim 2, wherein the first shaft part comprises:
 a first circumferential groove formed in the inner surface of the channel; and
 a second circumferential groove formed in an outer surface of the extension, wherein a snap ring is disposed within the first circumferential groove and the second circumferential groove to couple the first shaft part and the second shaft part to one another.

4. The hydraulic steering system of claim 3, wherein the second shaft part comprises a chamfer formed between an inner surface of the channel and a longitudinal end of the first shaft part to facilitate placement of the snap ring within the first and second circumferential grooves.

5. The hydraulic steering system of claim 2, wherein the first shaft part and the second shaft part are coupled to one another via a pin that extends at least partially through the channel of the first shaft part and the extension of the second shaft part.

6. The hydraulic steering system of claim 5, wherein the first shaft part comprises a first radial opening extending radially through an inner surface of the channel and an outer surface of the first shaft part and a second radial opening extending radially though at least the inner surface of the channel at a location of the channel radially opposite the first radial opening, the second shaft part comprises a third radial opening extending radially through a first outer surface of the extension and a second outer surface of the extension, and the pin extends through the first, second, and third radial openings to couple the first shaft part and the second shaft part to one another.

7. The hydraulic steering system of claim 6, wherein the hydraulic cylinder comprises a fourth radial opening extending through an outer surface of the hydraulic cylinder and an inner surface of the hydraulic cylinder proximate to the first longitudinal end of the hydraulic cylinder to enable insertion of the pin to couple the first shaft part and the second shaft part to one another.

8. The hydraulic steering system of claim 7, wherein a respective width of a first gland disposed on the first longitudinal end portion of the hydraulic cylinder is at least as large as a respective width of the fourth radial opening to enable the first gland to block a flow of hydraulic fluid through the fourth radial opening.

9. The hydraulic steering system of claim 8, wherein the hydraulic cylinder comprises a spacer disposed within the first chamber proximate to the first gland, a respective width of the spacer is at least as large as the respective width of the first radial opening.

10. The hydraulic steering system of claim 1, wherein the hydraulic cylinder comprises an annular seal disposed between the first shaft part and the second shaft part, wherein the annular seal is configured to block a flow of hydraulic fluid between the first and second shaft parts.

11. The hydraulic steering system of claim 1, wherein the plurality of sealing members comprise:
   a first gland disposed on the first longitudinal end portion of the hydraulic cylinder;
   a second gland disposed on the second longitudinal end portion of the hydraulic cylinder; and
   a seal disposed within the hydraulic cylinder between the first piston and the second piston.

12. The hydraulic steering system of claim 1, wherein the second piston is integrally formed on the second shaft part.

13. The hydraulic steering system of claim 1, wherein the second piston of the second shaft part is threadably coupled to the first shaft part.

14. A hydraulic steering system of a work vehicle, comprising:
   a hydraulic cylinder assembly configured to receive hydraulic fluid, wherein the hydraulic cylinder assembly comprises:
      a hydraulic cylinder comprising a first longitudinal end portion and a second longitudinal end portion;
      a shaft assembly disposed within the hydraulic cylinder, comprising:
         a first shaft part extending within the hydraulic cylinder, wherein the first shaft part comprises a first diameter for a first portion of the first shaft part, a second diameter for a second portion of the first shaft part, and a third diameter for a third portion of the first shaft part, wherein the first shaft part comprises a first piston integrally formed with the first shaft part between the first portion and the second portion of the first shaft part, and configured to receive a first force from the hydraulic fluid that causes the shaft assembly to move relative to the hydraulic cylinder, and a radially-outer surface of the first shaft part further comprises a first threaded portion disposed between the second portion and the third portion of the first shaft part; and
         a second shaft part comprising a second piston configured to receive a second force from the hydraulic fluid that causes the shaft assembly to move relative to the hydraulic cylinder, a radially-inner surface of the second shaft part comprises a second threaded portion, and the second threaded portion is threaded into the first threaded portion to connect the second shaft part to the first shaft part; and
   a plurality of sealing members configured to extend radially between the hydraulic cylinder and the shaft assembly to separate the hydraulic cylinder into a first chamber comprising the first piston and a second chamber comprising the second piston, wherein the first chamber and the second chamber are fluidly isolated from each other, and wherein the plurality of sealing members comprise:
      a first gland disposed on the first longitudinal end portion of the hydraulic cylinder;
      a second gland disposed on the second longitudinal end portion of the hydraulic cylinder; and
      a seal disposed within the hydraulic cylinder between the first piston and the second piston.

* * * * *